(12) United States Patent
Bankoski et al.

(10) Patent No.: US 8,780,971 B1
(45) Date of Patent: Jul. 15, 2014

(54) SYSTEM AND METHOD OF ENCODING USING SELECTABLE LOOP FILTERS

(75) Inventors: James Bankoski, Wynantskill, NY (US); Paul Wilkins, Cambridge (GB); Yaowu Xu, San Diego, CA (US)

(73) Assignee: Google, Inc., Mountain View, CA (US)

( * ) Notice: Subject to any disclaimer, the term of this patent is extended or adjusted under 35 U.S.C. 154(b) by 564 days.

(21) Appl. No.: 13/081,535

(22) Filed: Apr. 7, 2011

(51) Int. Cl.
*H04N 7/40* (2006.01)
*G06K 9/40* (2006.01)

(52) U.S. Cl.
USPC .......................................... 375/240; 382/260

(58) Field of Classification Search
USPC ........... 375/240; 382/232, 233, 260, 262, 264
See application file for complete search history.

(56) References Cited

U.S. PATENT DOCUMENTS

| | | | |
|---|---|---|---|
| 3,825,832 A | 7/1974 | Frei et al. | |
| 4,710,810 A | 12/1987 | Koga | |
| 4,719,642 A | 1/1988 | Lucas | |
| 4,729,127 A | 3/1988 | Chan et al. | |
| 4,736,446 A | 4/1988 | Reynolds et al. | |
| 4,816,906 A | 3/1989 | Kummerfeldt et al. | |
| 4,868,764 A | 9/1989 | Richards | |
| 4,891,748 A | 1/1990 | Mann | |
| 4,924,310 A | 5/1990 | von Brandt | |
| 5,068,724 A | 11/1991 | Krause et al. | |
| 5,083,214 A | 1/1992 | Knowles | |
| 5,091,782 A | 2/1992 | Krause et al. | |
| 5,136,371 A | 8/1992 | Savatier et al. | |
| 5,136,376 A | 8/1992 | Yagasaki et al. | |
| 5,148,269 A | 9/1992 | de Haan et al. | |
| 5,164,819 A | 11/1992 | Music | |
| 5,270,812 A | 12/1993 | Richards | |
| 5,274,442 A | 12/1993 | Murakami et al. | |
| 5,278,647 A | 1/1994 | Hingorani et al. | |
| 5,313,306 A | 5/1994 | Kuban et al. | |
| 5,337,086 A | 8/1994 | Fujinami | |

(Continued)

FOREIGN PATENT DOCUMENTS

| | | |
|---|---|---|
| EP | 0634873 | 1/1995 |
| EP | 1351510 | 10/2003 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Sath V Perungavoor
*Assistant Examiner* — Howard D Brown, Jr.
(74) *Attorney, Agent, or Firm* — Young, Basile, Hanlon & MacFarlane, P.C.

(57) ABSTRACT

Disclosed herein is a method for selectively filtering and encoding a video signal having at least one frame including a matrix of pixels. The method includes selecting a set of pixels within the frame, determining an initial performance measurement for the selected set of pixels, provisionally applying each filter to the set of pixels, determining a second performance measurement for each filter provisionally applied to the selected set of pixels, and applying the at least one filter to the selected set of pixels to generate a reconstruction of the frame if the at least one filter is determined to have a second performance measurement that is better than the initial performance measurement.

20 Claims, 7 Drawing Sheets

(56) References Cited

U.S. PATENT DOCUMENTS

| | | | |
|---|---|---|---|
| 5,341,440 A | 8/1994 | Earl et al. |
| 5,365,280 A | 11/1994 | De Haan et al. |
| 5,377,018 A | 12/1994 | Rafferty |
| 5,398,068 A | 3/1995 | Liu et al. |
| 5,432,870 A | 7/1995 | Schwartz |
| 5,457,780 A | 10/1995 | Shaw et al. |
| 5,461,423 A | 10/1995 | Tsukagoshi |
| 5,488,570 A | 1/1996 | Agarwal |
| 5,512,952 A | 4/1996 | Iwamura |
| 5,561,477 A | 10/1996 | Polit |
| 5,568,200 A | 10/1996 | Pearlstein et al. |
| 5,576,767 A | 11/1996 | Lee et al. |
| 5,579,348 A | 11/1996 | Walker et al. |
| 5,623,308 A | 4/1997 | Civanlar et al. |
| 5,629,736 A | 5/1997 | Haskell et al. |
| 5,640,208 A | 6/1997 | Fujinami |
| 5,686,962 A | 11/1997 | Chung et al. |
| 5,689,306 A | 11/1997 | Jung |
| 5,706,059 A | 1/1998 | Ran et al. |
| 5,717,791 A * | 2/1998 | Labaere et al. ............... 382/274 |
| 5,721,822 A | 2/1998 | Agarwal |
| 5,731,840 A | 3/1998 | Kikuchi et al. |
| 5,734,744 A | 3/1998 | Wittenstein et al. |
| 5,737,020 A | 4/1998 | Hall et al. |
| 5,748,242 A | 5/1998 | Podilchuk |
| 5,748,249 A | 5/1998 | Fujiwara |
| 5,767,909 A | 6/1998 | Jung |
| 5,774,593 A | 6/1998 | Zick et al. |
| 5,812,197 A | 9/1998 | Chan et al. |
| 5,818,536 A | 10/1998 | Morris et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,912,707 A | 6/1999 | Kim |
| 5,926,226 A | 7/1999 | Proctor et al. |
| 5,929,940 A | 7/1999 | Jeannin |
| 5,930,493 A | 7/1999 | Ottesen et al. |
| 5,946,414 A | 8/1999 | Cass et al. |
| 5,959,672 A | 9/1999 | Sasaki |
| 5,963,203 A | 10/1999 | Goldberg et al. |
| 5,985,526 A | 11/1999 | Tutt et al. |
| 5,987,866 A | 11/1999 | Weeger et al. |
| 5,991,447 A | 11/1999 | Eifrig et al. |
| 5,999,641 A | 12/1999 | Miller et al. |
| 6,005,980 A | 12/1999 | Eifrig et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,097,842 A | 8/2000 | Suzuki et al. |
| 6,100,940 A | 8/2000 | Dieterich |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,201,896 B1 | 3/2001 | Ishikawa |
| 6,212,234 B1 | 4/2001 | Andoh et al. |
| 6,233,279 B1 | 5/2001 | Boon |
| 6,240,135 B1 | 5/2001 | Kim |
| 6,272,179 B1 | 8/2001 | Kadono |
| 6,285,801 B1 | 9/2001 | Mancuso et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,389,072 B1 | 5/2002 | Tzou et al. |
| 6,400,763 B1 | 6/2002 | Wee |
| 6,414,995 B2 | 7/2002 | Okumura et al. |
| 6,418,166 B1 | 7/2002 | Wu et al. |
| 6,431,197 B2 | 8/2002 | Hintzman et al. |
| 6,434,197 B1 | 8/2002 | Wang et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,529,638 B1 | 3/2003 | Westerman |
| 6,560,366 B1 | 5/2003 | Wilkins |
| 6,570,924 B1 | 5/2003 | Lynch et al. |
| 6,621,867 B1 | 9/2003 | Sazzad et al. |
| 6,661,842 B1 | 12/2003 | Abousleman |
| 6,687,303 B1 | 2/2004 | Ishihara |
| 6,697,061 B1 | 2/2004 | Wee et al. |
| 6,707,952 B1 | 3/2004 | Tan et al. |
| 6,735,249 B1 | 5/2004 | Karczewicz et al. |
| 6,765,964 B1 | 7/2004 | Conklin |
| 6,798,837 B1 | 9/2004 | Uenoyama et al. |
| 6,807,317 B2 | 10/2004 | Mathew et al. |
| 6,826,229 B2 | 11/2004 | Kawashima et al. |
| 6,904,096 B2 | 6/2005 | Kobayashi et al. |
| 6,907,079 B2 | 6/2005 | Gomila et al. |
| 6,934,419 B2 | 8/2005 | Zlotnick |
| 7,027,654 B1 | 4/2006 | Ameres et al. |
| 7,054,367 B2 | 5/2006 | Oguz et al. |
| 7,088,351 B2 | 8/2006 | Wang |
| 7,116,831 B2 | 10/2006 | Mukerjee et al. |
| 7,170,937 B2 | 1/2007 | Zhou |
| 7,194,036 B1 | 3/2007 | Melanson |
| 7,226,150 B2 | 6/2007 | Yoshimura et al. |
| 7,236,524 B2 | 6/2007 | Sun et al. |
| 7,260,148 B2 | 8/2007 | Sohm |
| 7,277,592 B1 | 10/2007 | Lin |
| 7,330,509 B2 | 2/2008 | Lu et al. |
| 7,358,881 B2 | 4/2008 | Melanson |
| 7,447,337 B2 | 11/2008 | Zhang et al. |
| 7,492,823 B2 | 2/2009 | Lee et al. |
| 7,499,492 B1 | 3/2009 | Ameres et al. |
| 7,590,179 B2 | 9/2009 | Mukerjee |
| 7,606,310 B1 | 10/2009 | Ameres et al. |
| 7,627,040 B2 | 12/2009 | Woods et al. |
| 7,657,098 B2 | 2/2010 | Lin et al. |
| 7,751,514 B2 | 7/2010 | Tsuie et al. |
| 7,916,783 B2 * | 3/2011 | Gao et al. ................. 375/240.03 |
| 8,259,819 B2 * | 9/2012 | Liu et al. .................. 375/240.29 |
| 8,325,805 B2 * | 12/2012 | Cho et al. ................. 375/240.12 |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0064228 A1 | 5/2002 | Sethuraman et al. |
| 2002/0071485 A1 | 6/2002 | Caglar et al. |
| 2002/0141501 A1 | 10/2002 | Krishnamachari |
| 2002/0159524 A1 | 10/2002 | Gunter et al. |
| 2002/0168114 A1 | 11/2002 | Valente |
| 2002/0172431 A1 * | 11/2002 | Atkins et al. .................. 382/260 |
| 2002/0176502 A1 | 11/2002 | Rose et al. |
| 2003/0023982 A1 | 1/2003 | Lee et al. |
| 2003/0039310 A1 | 2/2003 | Wu et al. |
| 2003/0053708 A1 | 3/2003 | Kryukov et al. |
| 2003/0053711 A1 | 3/2003 | Kim |
| 2003/0081850 A1 | 5/2003 | Karczewicz et al. |
| 2003/0165331 A1 | 9/2003 | Van Der Schaar |
| 2003/0189982 A1 | 10/2003 | MacInnis |
| 2003/0194009 A1 | 10/2003 | Srinivasan |
| 2003/0215014 A1 | 11/2003 | Koto et al. |
| 2004/0013308 A1 | 1/2004 | Jeon et al. |
| 2004/0017939 A1 | 1/2004 | Mehrotra |
| 2004/0042549 A1 | 3/2004 | Huang et al. |
| 2004/0062307 A1 | 4/2004 | Hallapuro et al. |
| 2004/0080669 A1 | 4/2004 | Nagai et al. |
| 2004/0120400 A1 | 6/2004 | Linzer |
| 2004/0179610 A1 | 9/2004 | Lu et al. |
| 2004/0181564 A1 | 9/2004 | MacInnis et al. |
| 2004/0184533 A1 | 9/2004 | Wang |
| 2004/0228410 A1 | 11/2004 | Ameres et al. |
| 2004/0240556 A1 | 12/2004 | Winger et al. |
| 2005/0013494 A1 | 1/2005 | Srinivasan et al. |
| 2005/0053294 A1 | 3/2005 | Mukerjee et al. |

(56) References Cited

U.S. PATENT DOCUMENTS

| | | |
|---|---|---|
| 2005/0117653 A1 | 6/2005 | Sankaran |
| 2005/0147165 A1 | 7/2005 | Yoo et al. |
| 2005/0169374 A1 | 8/2005 | Marpe et al. |
| 2005/0196063 A1 | 9/2005 | Guangxi et al. |
| 2005/0265447 A1 | 12/2005 | Park |
| 2005/0276323 A1 | 12/2005 | Martemyanov et al. |
| 2005/0286629 A1 | 12/2005 | Dumitras et al. |
| 2006/0013315 A1 | 1/2006 | Song |
| 2006/0062311 A1 | 3/2006 | Sun et al. |
| 2006/0093038 A1 | 5/2006 | Boyce |
| 2006/0098737 A1 | 5/2006 | Sethuraman et al. |
| 2006/0098738 A1 | 5/2006 | Cosman et al. |
| 2006/0126962 A1 | 6/2006 | Sun |
| 2006/0153301 A1 | 7/2006 | Guleryuz |
| 2006/0182181 A1 | 8/2006 | Lee et al. |
| 2006/0215758 A1 | 9/2006 | Kawashima |
| 2006/0239345 A1 | 10/2006 | Taubman et al. |
| 2007/0009044 A1 | 1/2007 | Tourapis et al. |
| 2007/0009171 A1* | 1/2007 | Nakashizuka et al. ........ 382/263 |
| 2007/0025448 A1 | 2/2007 | Cha et al. |
| 2007/0047648 A1 | 3/2007 | Tourapis et al. |
| 2007/0081593 A1 | 4/2007 | Jeong et al. |
| 2007/0098067 A1 | 5/2007 | Kim et al. |
| 2007/0110152 A1 | 5/2007 | Lee et al. |
| 2007/0140342 A1 | 6/2007 | Karczewicz et al. |
| 2007/0153899 A1 | 7/2007 | Koto et al. |
| 2007/0171988 A1 | 7/2007 | Panda et al. |
| 2007/0177673 A1 | 8/2007 | Yang |
| 2007/0189735 A1 | 8/2007 | Kawashima et al. |
| 2007/0201559 A1 | 8/2007 | He |
| 2007/0230572 A1 | 10/2007 | Koto et al. |
| 2007/0237241 A1 | 10/2007 | Ha et al. |
| 2007/0253490 A1 | 11/2007 | Makino |
| 2007/0253491 A1 | 11/2007 | Ito et al. |
| 2007/0274385 A1 | 11/2007 | He |
| 2007/0274388 A1 | 11/2007 | Lee et al. |
| 2008/0025398 A1 | 1/2008 | Molloy et al. |
| 2008/0025411 A1 | 1/2008 | Chen et al. |
| 2008/0101469 A1 | 5/2008 | Ishtiaq et al. |
| 2008/0130755 A1 | 6/2008 | Loukas et al. |
| 2008/0159649 A1 | 7/2008 | Kempf et al. |
| 2008/0170629 A1 | 7/2008 | Shim et al. |
| 2008/0198931 A1 | 8/2008 | Chappalli et al. |
| 2008/0212678 A1 | 9/2008 | Booth et al. |
| 2008/0219351 A1 | 9/2008 | Kim et al. |
| 2008/0279279 A1 | 11/2008 | Liu et al. |
| 2008/0298472 A1 | 12/2008 | Jain et al. |
| 2009/0034617 A1 | 2/2009 | Tanaka |
| 2009/0161770 A1 | 6/2009 | Dong et al. |
| 2009/0196351 A1 | 8/2009 | Cho et al. |
| 2009/0287493 A1 | 11/2009 | Janssen et al. |
| 2010/0022815 A1 | 1/2010 | Chikamatsu et al. |
| 2010/0034268 A1 | 2/2010 | Kusakabe et al. |
| 2011/0007799 A1 | 1/2011 | Karczewicz et al. |

FOREIGN PATENT DOCUMENTS

| | | |
|---|---|---|
| EP | 1555832 | 7/2005 |
| EP | 767588 | 3/2007 |
| EP | 1838108 | 9/2007 |
| EP | 1840875 | 10/2007 |
| JP | 61092073 | 5/1986 |
| JP | 2217088 | 9/1990 |
| JP | 2272970 | 11/1990 |
| JP | 06038197 | 2/1994 |
| JP | 8280032 | 10/1996 |
| JP | 09037246 | 7/1997 |
| JP | 09179987 | 7/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| JP | 2005503737 | 2/2005 |
| JP | 2005308623 | 11/2005 |
| JP | 2008154221 | 7/2008 |
| KR | 100213018 | 9/1999 |
| KR | 20010030916 | 4/2001 |
| KR | 1020050018730 | 2/2005 |
| KR | 1020080056083 | 6/2008 |
| WO | WO9904574 | 1/1999 |
| WO | WO0150770 | 7/2001 |
| WO | WO02089487 | 11/2002 |
| WO | WO03026315 | 3/2003 |
| WO | WO2006602377 | 6/2006 |
| WO | WO2006083614 | 8/2006 |
| WO | WO2007052303 | 5/2007 |
| WO | WO2008005124 | 1/2008 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

A High Efficient Method for Parallelizing Reconstructor & Loop Deblocking Filter on Multi-core Processor Platform.

An Optimized In-Loop H.264 De-Blocking Filter on Multi-Core Engines.

Architectures for Efficient Partitioning of Video Coding Algorithms—H. 264 decoder.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Ebrahimi, Touradj, et al.; "Joint motion estimation and segmentation for very low bitrate video coding", SPIE vol. 2501, 1995, 12 pp.

(56) References Cited

OTHER PUBLICATIONS

Guillotel, Philippe, et al.; "Comparison of motion vector coding techniques", SPIE vol. 2308, 1994, 11 pp.

International Telecommunications Union, ITU-T, Telecommunication Standardization Section of ITU, "Series H: Audiovisual and Multimedia Systems, Infrastructure of audiovisual services—Coding of moving video", Mar. 2010, 676 pp.

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Lee, Yung-Lyul; Park, Hyun Wook; "Loop Filtering and Post-Filtering for Low-Bit-Rates Moving Picture Coding", Signal Processing: Image Communication 16 (2001) pp. 871-890.

Lihua Zhu, Guangfei Zhu, Charles Wang; Implementation of video deblocking filter on GPU Apr. 8, 2008.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Method for unloading YUV-filtered pixels from a deblocking filter for a video decoder, Oct. 11, 2006.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

ON2 Technologies Inc., White Paper TrueMotion VP7 Video Codec, Jan. 10, 2005, 13 pages, Document Version: 1.0, Clifton Park, New York.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Sikora, T. et al., Shape-adaptive DCT for generic coding of video, Circuits and Systems for Video Technology, IEEE Transactions on vol. 5, Issue 1, p. 59-62, Feb. 1, 1995.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Sye-Hoon Oh, et al. "An Adaptive Sharpening Filter Using Quantization Step Size and Pixel Variance in H.264/AVC", Consumer Electronics (ICCE), IEEE International Conference on Jan. 9, 2011.

Wenger et al.; RTP Payload Format for H.264 Video; The Internet Society; 2005.

Wiegand et al, "Overview of the H 264/AVC Video Coding Standard," IEEE Transactions on Circuits and Systems for Video Technology, vol. 13, No. 7, pp. 568, 569, Jul. 1, 2003.

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Wu, Yaowu; "InsideWebM Technology: The VP8 Alternate Reference Frame"; http://blog.webmproject.org/2010/05/inside-webm-techno1 ogy-vp8-a1lternate.html dated May 27, 2010.

Zhang, Kui, et al.; "Variable Block Size Video Coding With Motion Prediction and Motion Segmentation", SPIE vol. 2419, 1995, 9 pp.

Zhi Liu, Zhaoyang Zhang, Liquan Shen, Mosaic Generation in H.264 Compressed Domain, IEEE 2006.

Mohmoudi, Mona et al.; "Fast Image and video Denoising via Nonlocal Means of Similar Neighborhoods"; IEEE Signal Processing Letters vol. 12, No. 12, Dec. 2005.

\* cited by examiner

SYSTEM AND METHOD OF ENCODING USING SELECTABLE LOOP FILTERS

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use prediction techniques to minimize the amount of data required to transmit video information by using, for example, the spatial and temporal coherences in video information.

Many prediction techniques use block based prediction and quantized block transforms. The use of block based prediction and quantized block transforms can give rise to discontinuities along block boundaries during encoding. These discontinuities can be visually disturbing and can reduce the quality of the decoded video and the effectiveness of the reference frame used as a predictor for subsequent frames. These discontinuities can be reduced by the application of a loop filter at the encoder.

A loop filter can be applied to a reconstructed frame or a portion of a reconstructed frame at an encoder. A loop filter is typically used to reduce ringing and blocking artifacts along block boundaries. Once a reconstructed frame is processed by the loop filter, it may be used as a predictor for subsequent frames. Some conventional loop filters apply different filtering strengths to different block boundaries. For example, some compression systems vary the strength of the loop filter based on how a reconstructed frame was encoded, for example, whether the block was encoded by inter-coding or intra-coding. Other compression systems apply a filter strength from a set of discrete filter strengths based on, for example, motion vector strength and the type of reference frame predictor used, such as shown by U.S. Pub. No. US-2010-0061645-A1, which is hereby incorporated by reference in its entirety.

SUMMARY

Embodiments of a method for encoding a video signal having at least one frame including a matrix of pixels are disclosed herein. In one embodiment, the method includes selecting a set of pixels within the frame and determining an initial performance measurement for the selected set of pixels. The method also includes provisionally applying at least one filter to the selected set of pixels and determining a second performance measurement for each filter provisionally applied to the selected set of pixels. Further, the method includes applying the at least one filter to the selected set of pixels to generate a reconstruction of the frame if the at least one filter is determined to have a second performance measurement that is better than the initial performance measurement.

Embodiments of an apparatus for encoding a video signal having at least one frame including a matrix of pixels are also disclosed herein. In one such embodiment, the apparatus includes a memory and a processor configured to execute instructions stored in the memory to select a set of pixels within the frame. The apparatus also includes a memory and processor configured to perform a threshold determination on at least one pixel in the set of pixels by determining whether a measurement of a filter dependent region of pixels satisfies a threshold criteria, provisionally apply each filters to the selected set of pixels and determine a second performance measurement for each filter provisionally applied to the selected set of pixels. Further, the memory and processor included in the apparatus is also configured to apply the at least one filter to the selected set of pixels to generate a reconstruction of the frame if the at least one filter is determined to have a second performance measurement that is better than the initial performance measurement, compare each second performance measurement with the initial performance measurement, and filter the selected set of pixels with filters that have a second performance measurement that is better than the initial performance measurement.

In another such embodiment, the apparatus includes means for selecting a set of pixels within the frame and means for determining an initial performance measurement for the selected set of pixels. The apparatus also includes means for provisionally applying at least one filter to the selected set of pixels and means for determining a second performance measurement for each filter provisionally applied to the selected set of pixels. Further, the apparatus includes means for applying the at least one filter to the selected set of pixels to generate a reconstruction of the frame if the at least one filter is determined to have a second performance measurement that is better than the initial performance measurement, means for comparing each second performance measurement with the initial performance measurement, and means for filtering the selected set of pixels with filters that have a second performance measurement that is better than the initial performance measurement.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
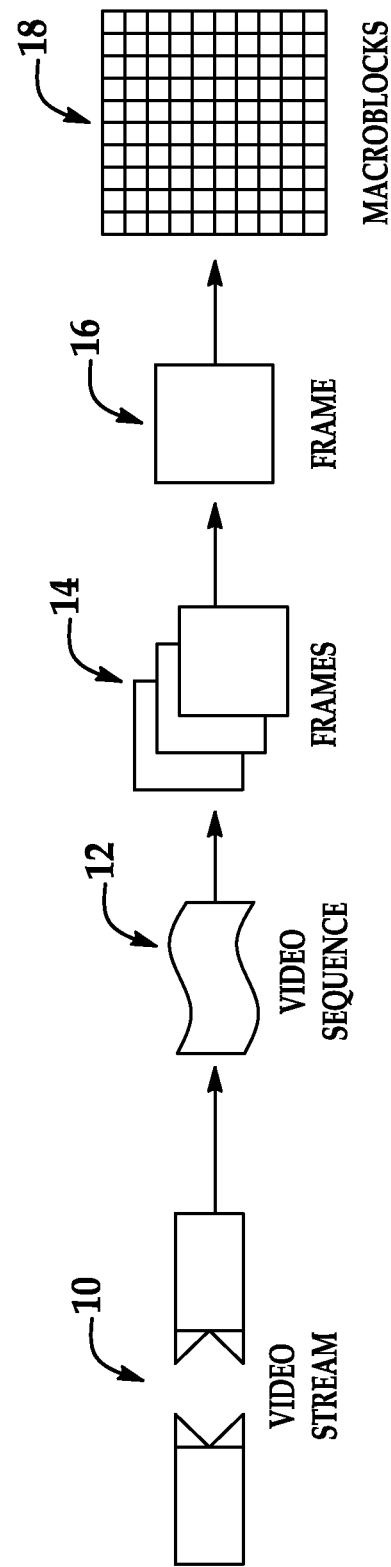
FIG. 1 is a diagram of a video bitstream.

FIG. 1 is a diagram a typical video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can then be further subdivided into a single frame 16. At the next level, frame 16 can be divided into a series of blocks or macroblocks 18, which can contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups.

Figure 2:
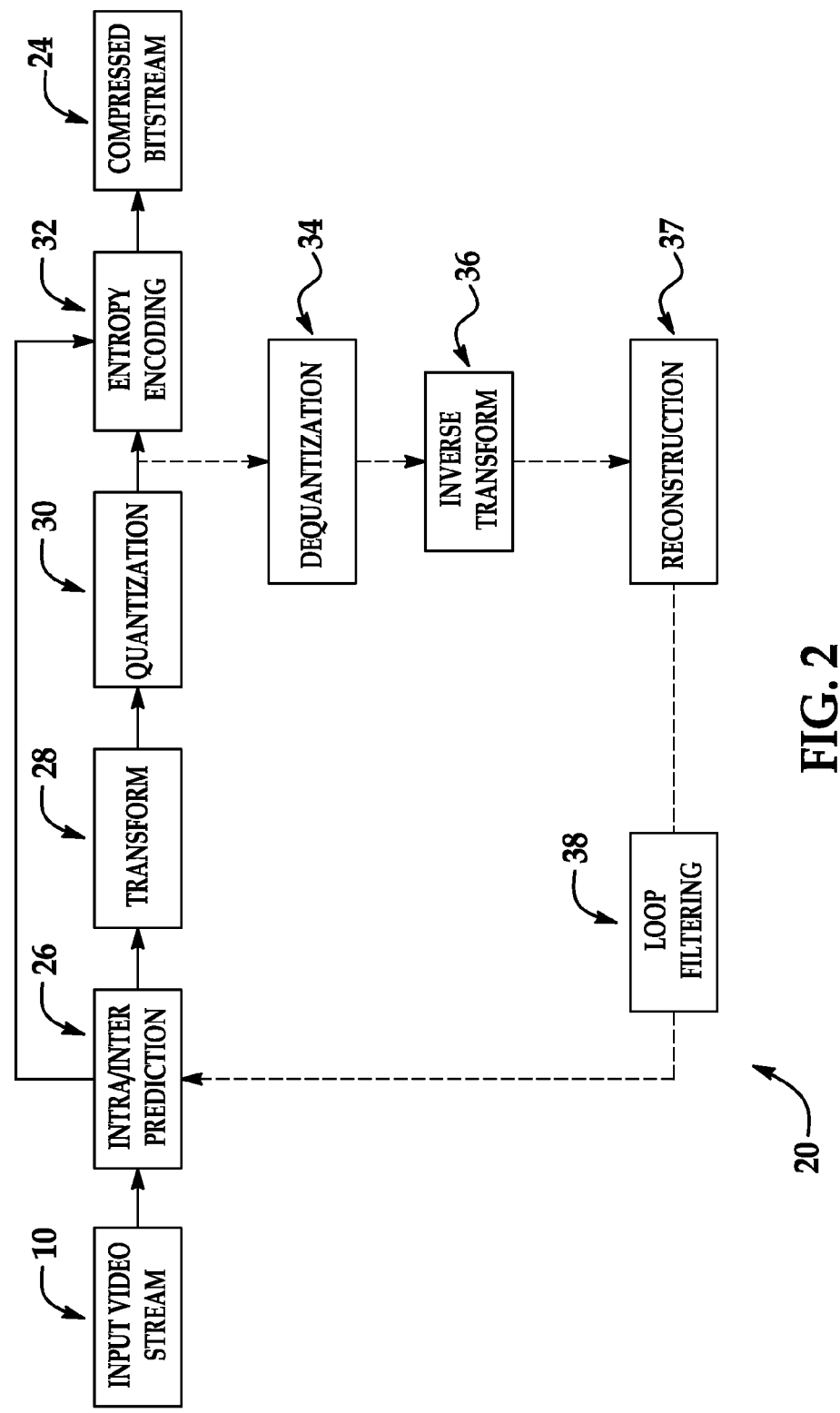
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or a compressed bitstream 24: an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has the following stages to perform the various functions in the reconstruction path: a dequantization stage 34, an inverse transform stage 36, a reconstruction stage 37 and a loop filtering stage 38. Other structural variations of encoder 20 can be used to encode input video stream 10.

When input video stream 10 is presented for encoding, each frame 16 within input video stream 10 can be processed full-frame, by units of macroblocks, or by any other segment of pixels in the frame. For example, at intra/inter prediction stage 26, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients in, for example, the frequency domain, and quantization stage 30 converts the transform coefficients into discrete quantum values, which are referred to as quantized transform coefficients or quantization levels. The quantized transform coefficients are then entropy encoded by entropy encoding stage 32. The entropy-encoded coefficients, together with the information required to decode the macroblock, such as the type of prediction used, motion vectors and quantizer value, are then output to compressed bitstream 24.

The reconstruction path in FIG. 2 is present to ensure that encoder 20 and decoder 42 use the same reference frames to decode compressed bitstream 24. The reconstruction path performs functions that are similar to functions that take place during the decoding process that are discussed in more detail below, including dequantizing the quantized transform coefficients at dequantization stage 34 and inverse transforming the dequantized transform coefficients at an inverse transform stage 36 in order to produce a derivative residual macroblock (derivative residual). At reconstruction stage 37, the prediction macroblock that was predicted at intra/inter prediction stage 26 can be added to the derivative residual to create a reconstructed macroblock. A loop filter 38 can then be applied to the reconstructed macroblock to reduce distortion such as blocking artifacts. The reconstruction path can include various modifications to improve the loop filtering process including error testing, thresholding, and selective filtering as disclosed herein.

Other variations of encoder 20 can be used to encode compressed bitstream 24. For example, a non-transform based encoder can quantize the residual signal directly without transform stage 28. Various forms of error testing, error correction and filtering can be implemented in the reconstruction loop. In another embodiment, an encoder may have quantization stage 30 and dequantization stage 34 combined into a single stage.

The encoding process shown in FIG. 2 can include two iterations or "passes" of processing the video data. The first pass can be carried out by encoder 20 using an encoding process that is less computationally intensive which gathers and stores information about input video stream 10 for use in the second pass. In the second pass, encoder 20 uses this information to optimize final encoding of compressed bitstream 24. For example, encoder 20 may use this information to select parameters for encoding, locating key-frames, selecting coding modes used to encode macroblocks 18 and allocating the number of bits to each frame. The output of the second pass can be final compressed bitstream 24.

Figure 3:
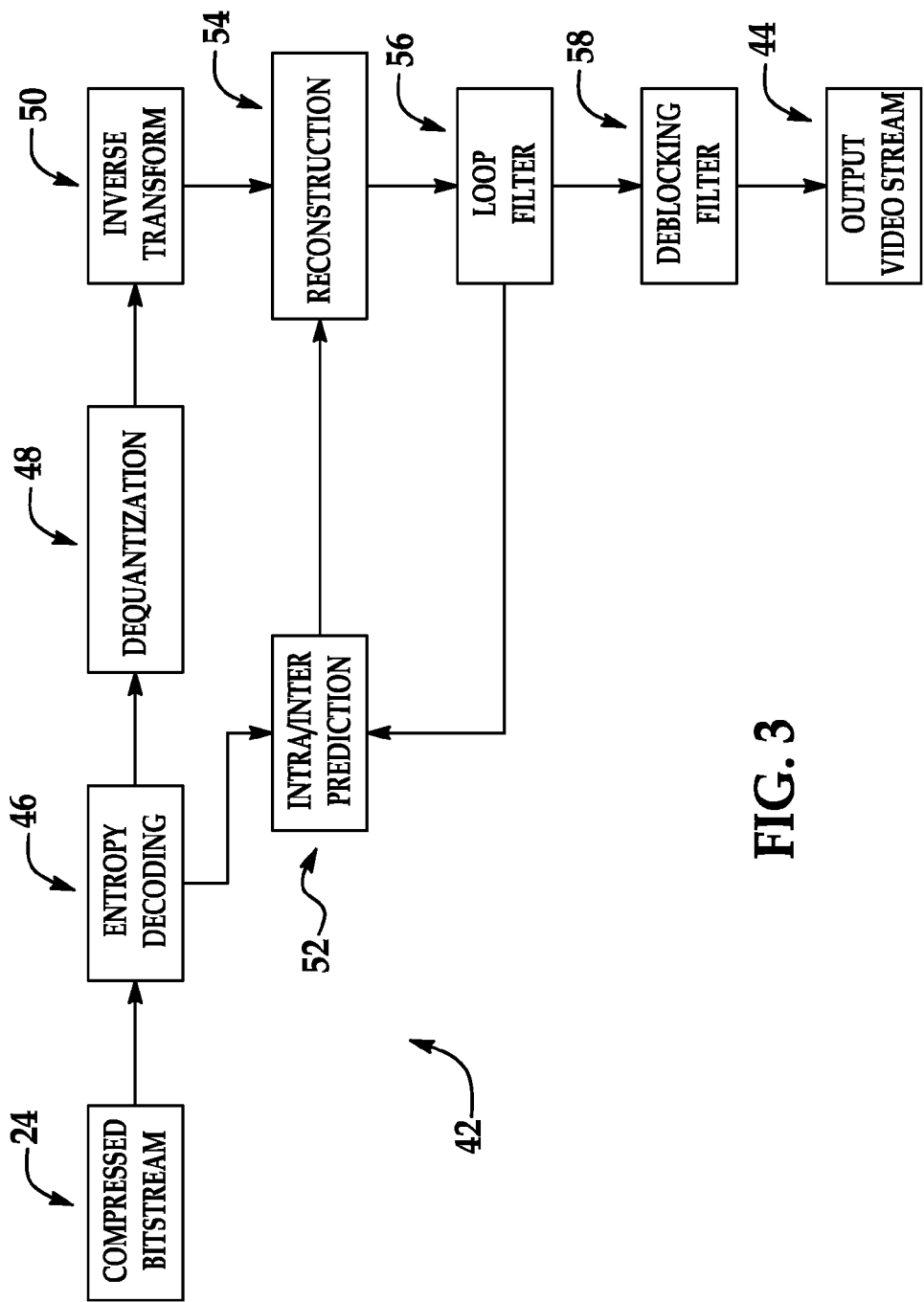
FIG. 3 is a block diagram of a video decompression system in accordance with one embodiment.

FIG. 3 is a block diagram of a video decompression system or decoder 42 to decode compressed bitstream 24. Decoder 42 similar to the reconstruction path of the encoder 20 discussed previously, preferably includes the following stages to perform various functions to produce an output video stream 44 from compressed bitstream 24: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements within compressed bitstream 24 can be entropy decoded by entropy decoding stage 46 (using, for example, Context Adaptive Binary Arithmetic Decoding) to produce a set of quantized transform coefficients. Dequantization stage 48 dequantizes the transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At reconstruction stage 54, the prediction macroblock can be added to the derivative residual to create a reconstructed macroblock. Loop filter 56 can be applied to the reconstructed macroblock to further reduce blocking artifacts. In order to reconstruct a frame, macroblock or image segment at decoder 42 as reconstructed at encoder 20, loop filter 56 should include the capabilities of loop filter 38. Deblocking filter 58 can be applied to the reconstructed macroblock to reduce blocking distortion, and the result is output as output video stream 44.

Other structural variations of decoder 42 can be used to decode compressed bitstream 24. For example, a decoder may produce output video stream 44 without deblocking filtering stage 58. Furthermore, for a decoder 42 that decodes a bitstream sent from encoder 60 as shown in FIG. 4, the decoder 42 can include thresholding, error testing and selectable loop filtering in the feedback loop to intra/inter prediction stage 52 to create the same reconstructed macroblock that was created at encoder 60.

Figure 4:
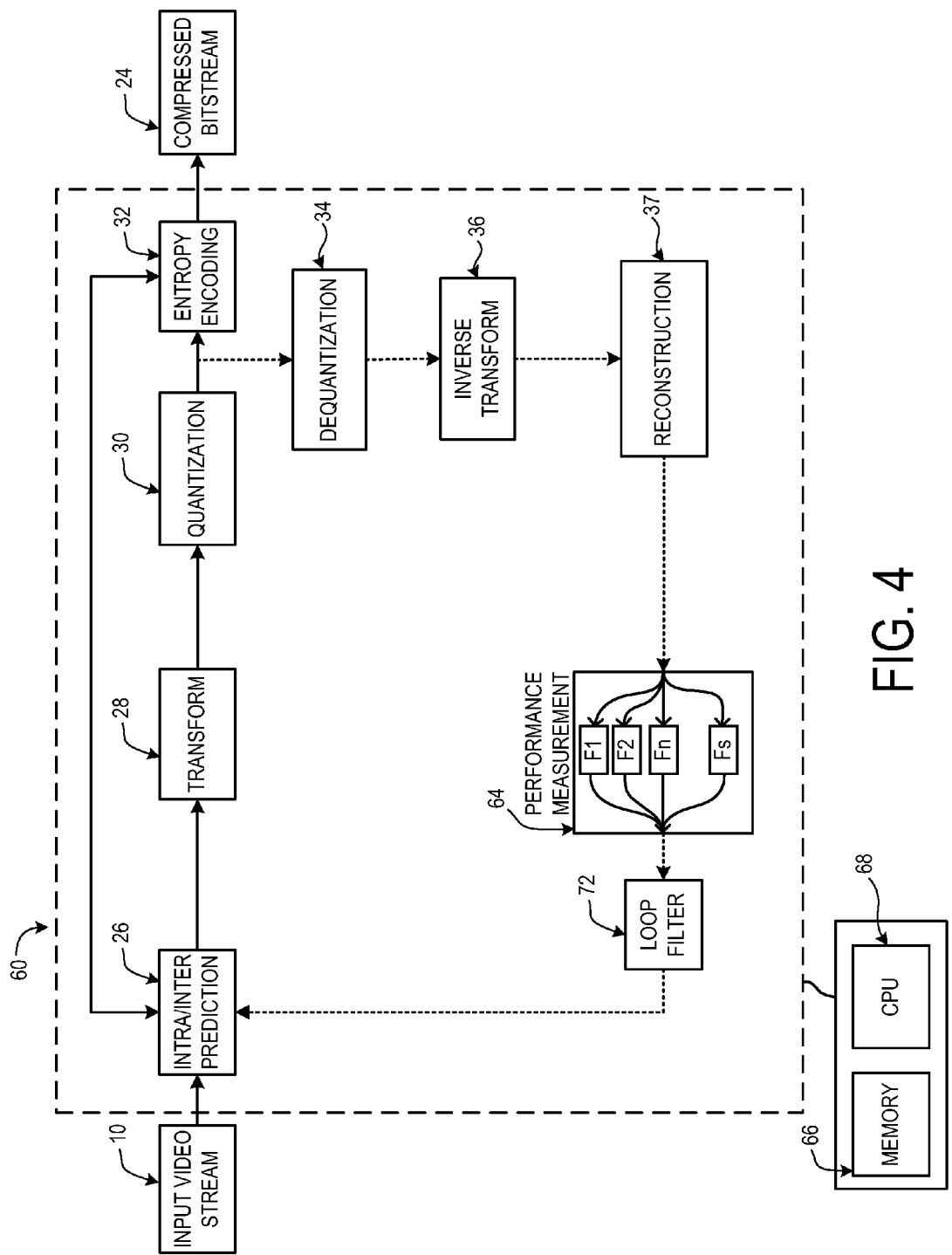
FIG. 4 is a block diagram of a video compression system in accordance with another embodiment.

With respect to FIG. 4, encoder 60 is one variation of encoder 20 that implements a group of filters, F1-Fn. Compression can be optimized by filtering a set of pixels, such as a macroblock of pixels 18, in a given frame 16 in the reconstruction path with filters F1-Fn or filters F1-Fn and default filter Fs which may be a sharpening filter or other suitable default filter. As stated previously, compressed bitstream 24 may include frames 14 that contain residual macroblocks. Because prediction macroblocks are subtracted from current macroblocks at intra/inter prediction stage 26 to form residual macroblocks, reducing the size of residual macroblocks can improve compression by reducing the number of bits used to represent each frame 16. One way to reduce the volume of bits needed to represent the residual macroblocks is to improve the accuracy of macroblock prediction at the intra/inter prediction stage 26.

The accuracy of macroblock prediction at stage 26 can be improved by a system that can select between multiple filter settings for a given set of pixels at loop filter 72 depending on the characteristics of the set of pixels. In addition to improving accuracy, selecting between multiple filter settings can also improve compression. The filter setting can be chosen in accordance with results obtained from performance measurement stage 64. For example, performance measurement stage 64 may compare a performance measurement of a given macroblock after provisional application of a filter with a performance measurement of that same macroblock prior to any filtration. The performance measurement may indicate quality, error, compression characteristics or a metric that takes into account quality, error and compression characteristics. Based on the results of such a comparison, CPU 68 may select zero, one or multiple filters from the group of filters F1-Fn to be used for loop filtering at stage 72. CPU 68 may select only the filters from F1-Fn that result in an improved performance measurement that is better than initial performance measurement for a particular macroblock.

An improved performance measurement is better than an initial performance measurement if its value is closer to a desired result. A desired result is typically a result in which a video signal is transmitted with higher quality or lower bandwidth or with greater reliability. Depending on the performance measurement, a "better" measurement could be numerically higher or lower. A performance measurement can be any metric used to indicate characteristics for a set of pixels. Rate distortion for example, is a metric that is a function of both error rate and coding efficiency. Customizing filtration on a macroblock by macroblock basis based on a performance measurement can result in a more robust and accurate prediction at intra/inter prediction stage 26.

Figure 5:
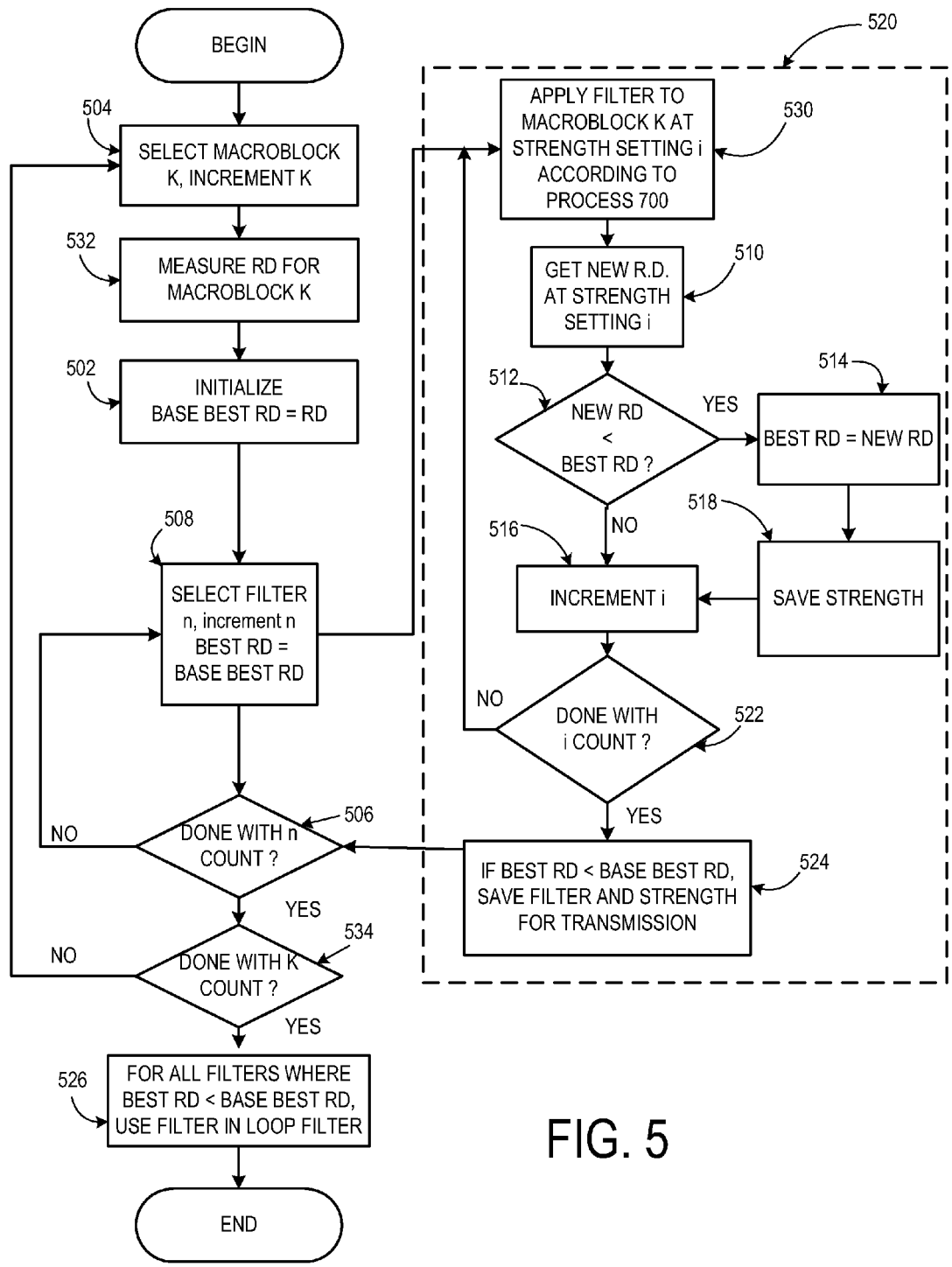
FIG. 5 is a flow chart of a method for performance measurement.

In one exemplary embodiment, selecting a subset of pixels, taking a performance measurement of that subset and selecting filters for loop filtration occurs according to the flow chart in FIG. 5. The process in FIG. 5 can be carried out by instructions sent from the controller depicted in FIG. 4 with memory 66 and CPU 68. At step 504, the set of pixels are selected. The set of selected pixels and can be an entire frame of pixels, a macroblock of pixels, or any other segment or number of pixels derived from a reconstructed frame assembled at reconstruction stage 37. One example of an image segment or set of pixels is a macroblock of pixels 600 depicted in FIG. 6. At step 532, the reconstructed image segment or set of pixels is measured for an initial performance measurement. The initial performance measurement measures some indicator of quality or error such as differences between an original set of pixels as constituted prior to encoding 60 and the reconstructed version of the original set of pixels at reconstruction stage 37. During encoding, transform stage 28 and quantization stage 30 can create errors between a frame in input video stream 10 and the reconstructed version of that same frame at reconstruction stage 37. An initial performance measurement may measure these errors or other errors related to a reconstructed frame. The performance measurement itself can be a sum of squares error, a mean squared error, or various other suitable measurements of error. The initial performance measurement can also be a calculation such as rate distortion, which takes into account an error measurement as well as coding efficiency.

Once an initial performance measurement has been determined for a particular set of pixels at step 532, the performance measurement for that set of pixels is stored. For example at step 502, a variable, here called base best rd, is initialized to the initial performance measurement for the set of pixels selected at step 504. Once the variable base best rd has been initialized, the first filter denoted by variable n is selected at step 508. As depicted in FIG. 5, each time a filter n is selected, process 520 shown by a dashed line box is engaged. When process 520 is complete, step 506 determines if all of the n filters have been selected. If all of the n filters have not been selected, step 508 increments n and selects the next filter. If all of the n filters have been selected, step 534 determines if there are any additional macroblocks that must undergo the process depicted in FIG. 5. If any of the k macroblocks remain, step 504 increments k and selects the next macroblock. If no macroblocks remain, step 526 the results of process 520 are implemented at loop filter 72.

Figure 7:
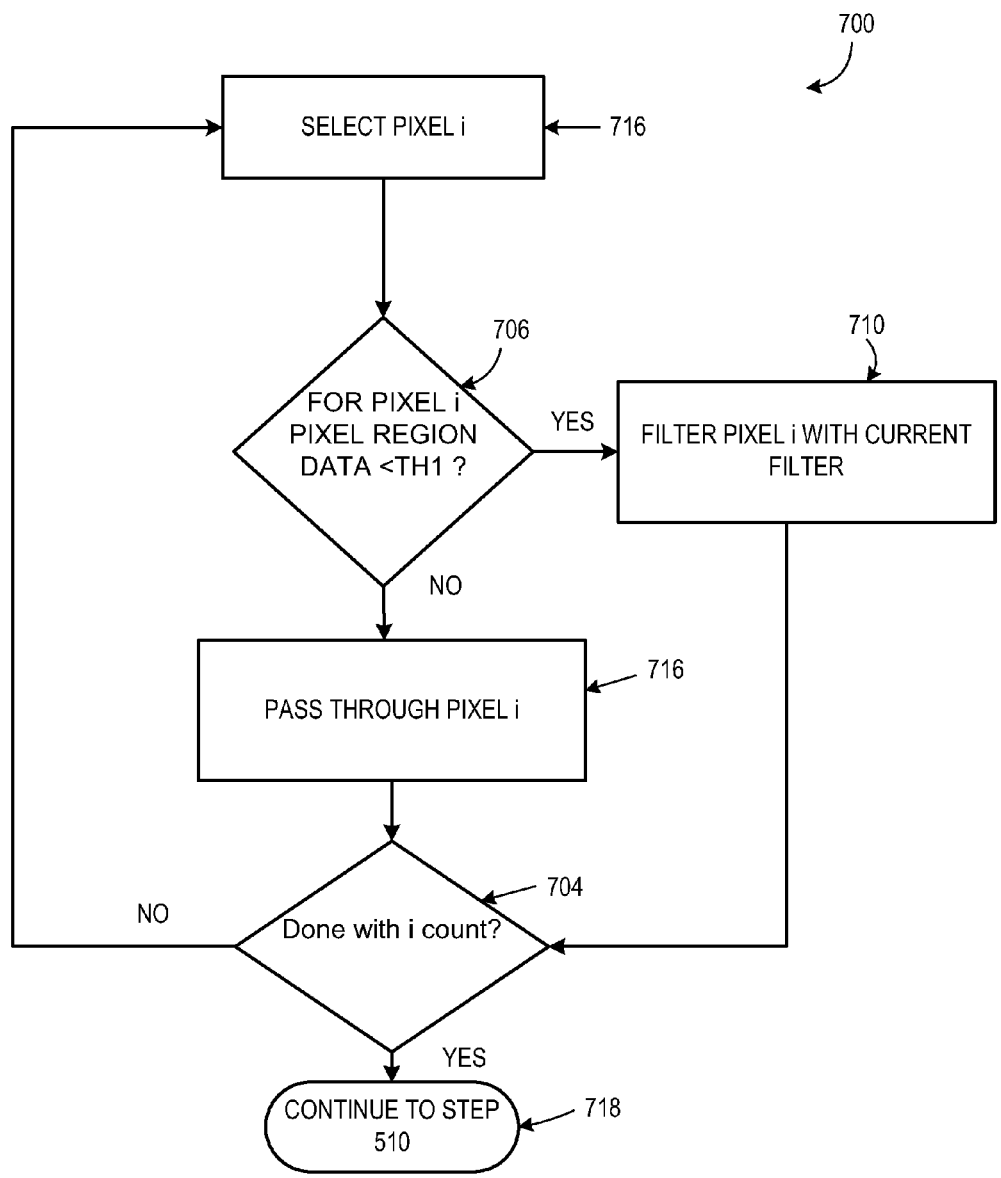
FIG. 7 is a flow chart of a method for applying a filter to a set of pixels

Within process 520, the filter selected at step 508 is applied to the particular set of pixels selected at step 504. At step 530, the filter n is applied to macroblock k, where filter n engages each pixel in macroblock k according to process 700 as shown in FIG. 7. During process 700, each pixel in the set of pixels in macroblock k is analyzed in a predetermined order such as, for example, raster scan order or any other suitable order. When a pixel is engaged at step 716, that pixel can be considered a "target pixel." Data is retrieved from pixels in the region of the target pixel to make a determination or calculation with respect to a given target pixel. Specifically, data from a filter dependent region of pixels surrounding a target pixel is collected. For example, each pixel in the filter dependent region of pixels contains data related to how each pixel will appear when displayed, such as luma or chroma data represented by a number as depicted in 606. Based on this data, process 700 determines if the target pixel should be filtered or bypassed without filtration at step 706. Process 520 is only an exemplary embodiment. For example, if a default filter such as a sharpening filter is selected at stage 508, process 530 may be bypassed such that all pixels in the set of pixels are automatically filtered without any threshold determinations being made. Using a sharpening filter as a default filter can be used to accentuate the edges of objects displayed in a frame of pixels by increasing the difference between certain pixel values that are in proximity to each other and may be desired to enhance filtration depending on the type of data being encoded.

Referring to how threshold determinations are made, the determination at step 706 is made by comparing data from the filter dependent region of pixels 602 surrounding a target pixel 604 and comparing that data with a threshold or strength setting. The terms threshold and strength setting may be used interchangeably. Each filter F1-Fn may use a different type of threshold criteria. For example, step 706 may average all pixels in the filter dependent region of pixels to determine if they differ in value from the target pixel by less than a threshold value. Step 706 may select filters that fall above or below a particular threshold criteria. In another exemplary embodiment, step 706 may indicate filter F1 should be applied to a given pixel if the statistical variance of the pixels in the filter dependent region is below a threshold value. The statistical variance threshold criteria may be less computationally intensive than the target pixel differential approach as less computations per pixel are required. Accordingly, the statistical variance approach may be used for filters with a large amount of taps, such as long blur filters.

Once a threshold determination is made at step 706, process 700 will either filter the target pixel at step 710 or pass through the target pixel without filtration at step 716. In either case, the next step is to move to the next pixel at step 704. In some embodiments, this process will continue until all pixels in the set of pixels selected at step 504 have received a threshold determination for the filter selected at step 508.

Figure 6B:
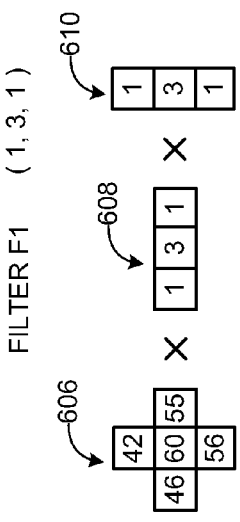
FIG. 6B is a schematic diagram of filtering a target pixel using one type of filter.
Figure 6D:
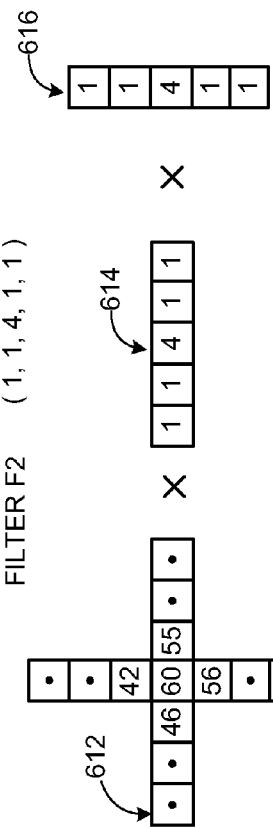
FIG. 6D is a schematic diagram of filtering a target pixel using another type of filter.

By way of example, filter F1 may be a one dimensional filter such as a one dimensional finite impulse response (FIR) filter with 3 taps and weights of (1, 3, 1) designed to be applied in the horizontal and vertical directions about a target pixel, for example, as shown in FIG. 6B. Because of the properties of exemplary filter F1, the filter dependent region of pixels forms a cross section of pixels 602 including a row of 3 pixels centered at target pixel 604 and a column of 3 pixels centered at target pixel 604. When an n-tap filter is one dimensional and is designed to be applied in the horizontal and vertical directions, the filter dependent region will contain 2*n pixels and will form a cross section centered at the target pixel as shown in 602.

Figure 6A:
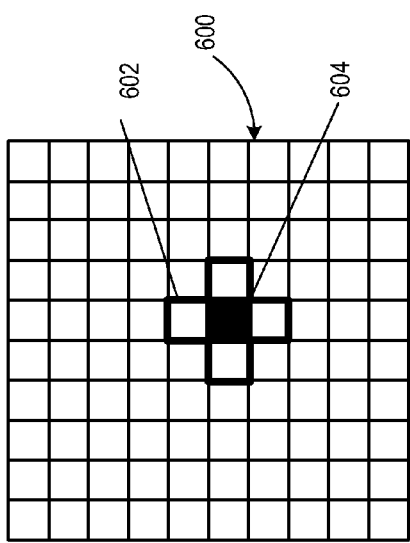
FIG. 6A is a schematic diagram of a set of pixels, a filter dependent region of pixels using one type of filter, and a target pixel in accordance with one embodiment.
Figure 6C:
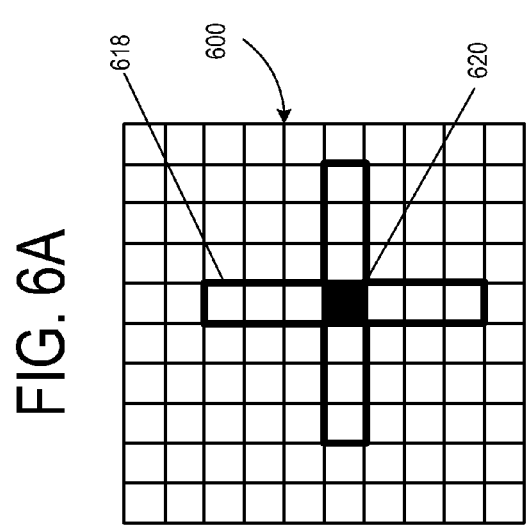
FIG. 6C is a schematic diagram of a set of pixels, a filter dependent region of pixels using another type of filter, and a target pixel in accordance with another embodiment.

Additionally, filter F2, may be a one dimensional FIR filter with 4 taps and weights of (1, 1, 4, 1, 1) designed to be applied in horizontal and vertical directions to a target pixel, for example as shown in FIG. 6C. Filters F1-Fn can also be two dimensional square filters that form a block of pixels about a target pixel or any other type of filter. Each filter selection has design advantages and disadvantages. For example, a threshold determination for a two dimensional filter will require more calculations than a one dimensional filter applied in the horizontal and vertical directions because the filter dependent region of pixels is larger. Filters F1-Fn may contain various other types of filters such as one or two dimensional filters, sharpening filters, blurring filters, linear filters, edge detecting filters, Gaussian filters, Laplacian filters, embossing filters, edge sharpening filters, or any other image processing filters with any number of taps or weights. In one exemplary embodiment, filters F1-Fn include one dimensional FIR filters with taps and weights of (1, 1, 1, 1, 1, 1, 1, 2, 1, 1, 1, 1, 1, 1, 1), (1, 1, 4, 1, 1) and (−1, 3, −1). In one exemplary embodiment, the (−1, 3, −1) filter is a default sharpening filter that is applied to all pixels in a set of pixels, such as a macroblock of pixels, at step 530 without determining whether each pixel in the set of pixels should be filtered or passed through without filtration at step 706.

In addition to the fact that each filter in F1-Fn may have a different threshold criteria, process 520 in FIG. 5 also alters the threshold value for each filter selected at step 508 so that a given filter is provisionally applied to a given set of pixels at multiple threshold values. For example, filter F1 may use statistical variance as its threshold criteria. Filter F1 may also have several different statistical variance values or strength settings, each of which is applied to the given set of pixels at step 530. Specifically, once a first threshold value or strength setting is used at step 530 and the set of pixels undergo a second performance measurement at step 510, a new threshold value or strength setting is received at step 516. Each filter may have any number of strength settings. The process of determining and applying new strength settings may repeat until all strength settings have been measured for performance. Alternatively, process 520 may discontinue the process of receiving new strength settings if, for example, rate distortion measurements at step 510 indicate worsening rate distortion measurements for a predetermined number of measurements.

FIGS. 6A and 6B show one example of the filtering process. The selected set of pixels selected at step 504 is shown as macroblock 600. Within process 700, target pixel 604 is selected at step 716 while cross section 602 is the filter dependent region of pixels from which data is taken to filter target pixel 604. The target pixel shown in 7B has a value of 60 while the values of the remaining pixels in the filter dependent region of pixels are 42, 46, 56 and 55. Steps 608 and 610 show one aspect of the filtering process. Selectable filters F1-Fn can be of any type or dimension. One type of filter can be a one dimensional FIR filter applied in the horizontal and vertical directions, for example. The filter may be applied horizontally and then vertically or vertically and then horizontally. These filters are also known as kernels and contain an array of values with one element in the array designated as origin of the kernel. The origin of kernels 608 and 610, for example, is 3. The origin of the kernel corresponds to the pixel that will be affected by neighboring pixels in the kernel, which is the target pixel.

In FIG. 6B, origin 3 corresponds to target pixel 60 in 706. In one embodiment, for example, if it is determined that any of the values 42, 46, 55 or 56 differ from the center pixel by less than a predetermined threshold at step 706, the target pixel with a value of 60 will be filtered. If the values are more than a predetermined threshold, the pixel will pass through the filter without filtration. Accordingly, depending on the strength setting determined at step 516, the number of pixels actually filtered in a given set of pixels for a given filter will change. Strength setting alteration step 516 may increase or decrease the strength setting or threshold value by a predetermined amount. To filter a target pixel, a convolution or correlation can be performed between the kernel and the filter dependent region of pixels 602 surrounding the target pixel 604. Convolutions and correlations calculate a weighted average of all the pixels in the filter dependent region 602. The resulting weighted average is used to replace the original target pixel value. As a result the target pixel value is altered or filtered based on the pixels in the filter dependent region surrounding it.

Once a threshold determination has been made for all pixels in the set of pixels such that each pixel has either been filtered at step 710 or passed through at step 716, a second performance measurement can be taken, such as rate distortion, for the set of pixels at step 510. At step 512, it is determined whether the second performance measurement from step 510 is less than the initial performance measurement determined at step 532. If the second performance measurement after filtration at step 530 is less than the initial performance measurement, variable best rd is updated with the new second performance measurement information. Furthermore, for each filter entering process 520, the filters can be measured for performance for each of any number of strength settings determined at step 516 as discussed previously. Although process 520 depicts an embodiment where a performance rate distortion measurement, other performance measurements can be used.

In one exemplary embodiment, each time a strength setting results in a better performance measurement, the best rd variable is updated at step 514 so that when all strength settings have been measured for performance, the strength setting with the best performance measurement is stored for that filter at step 518. Accordingly, for each filter entering process 520, at most one strength setting can be stored at step 524 and forwarded to loop filter stage 72 at step 526.

In one embodiment, if the strength setting with the best second performance measurement results in a second performance measurement that is better than the initial performance measurement, then that strength setting can be saved for a given filter at step 524. In one embodiment, step 524 can determine which of the filters will be used as a loop filter at stage 72 in FIG. 4 by flagging only those filters that were able to produce a rate distortion measurement lower than the initial rate distortion measurement. Once the filters for all pixels in the set of pixels has gone through process 520 as indicated by step 534, information associated with each filter that produced a second performance measurement better than the initial performance measurement is forwarded to loop filter stage 72 at a strength setting that produced the best performance measurement for that filter at step 526. Furthermore, the information associated with each filter is stored for transmission to be used at decoder 42 to recreate the same reconstructed and filtered image segment that was created at encoder 60. It should also be noted that in order to properly decode frames created at encoder 60, decoder 42 should implement the same reconstruction path as encoder 60 with stages 62, 64, and 72.

At loop filter stage 72, each pixel in the image segment or set of pixels can be filtered by the filters forwarded by performance measuring stage 64 at a strength setting indicated by performance measuring stage 64. Accordingly, depending on results from stage 64, each set of pixels or macroblock 18 in frame 16 can have between zero and n filters implemented at loop filter stage 72. Accordingly, a highly customized filtration scheme can be used to improve error rate or rate distortion for an image segment or set of pixels and thereby create an improved residual signal with improved rate distortion and compression characteristics.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

Further, the operations of encoder 20 or decoder 42 (and the algorithms, methods, instructions etc. stored thereon and/or executed thereby) can be realized in hardware, software or any combination thereof. For example, encoder 20 can be implemented using a general purpose processor with a computer program that, when executed, carries out any of the respective methods, algorithms and/or instructions described herein. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

Encoder 20 and decoder 42 can, for example, be implemented on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having at least one frame including a matrix of pixels, comprising:
   determining an initial performance measurement for a selected set of pixels using a processor;

provisionally applying at least one filter to the selected set of pixels;

determining a second performance measurement for each of a plurality of strength settings for each filter provisionally applied to the selected set of pixels, such that each provisional application of a filter is associated with a plurality of performance measurements; and applying the at least one filter to the selected set of pixels to generate a reconstruction of the frame based on a determination that the second performance measurement is better than the initial performance measurement, wherein each of the plurality of performance measurements is compared with the initial performance measurement.

2. The method of claim 1, wherein provisionally applying at least one filter to the selected set of pixels further comprises:

performing a threshold determination on at least one pixel in the set of pixels by determining whether a measurement of a filter dependent region of pixels satisfies a threshold criteria.

3. The method of claim 1, wherein determining the second performance measurement further comprises:

determining a performance measurement for each of the plurality of strength settings for each of the provisionally applied filters.

4. The method of claim 1, wherein applying the at least one filter to the selected set of pixels to generate a reconstruction of the frame further comprises:

applying all filters that received a second performance measurement that is better than the initial performance measurement to the selected set of pixels.

5. The method of claim 4, wherein the initial performance measurement and the second performance measurement are rate distortion.

6. The method of claim 4, further comprising:

selecting the strength setting that results in the best second performance measurement in the plurality of second performance measurements; and for each filter that received a second performance measurement that is better than the initial performance measurement, applying each filter at the selected strength setting.

7. The method of claim 2, wherein at least one of a sharpening filter and a blurring filter are provisionally applied to the selected set of pixels.

8. The method of claim 7, wherein the provisionally applied filters are one dimensional filters with n taps applied to a target pixel in both the horizontal and vertical directions so that the filter dependent region of pixels is a column and row of pixels centered at the target pixel.

9. The method of claim 8, wherein the provisionally applied filters comprise a one dimensional short blur filter, a one dimensional long blur filter and a one dimensional sharpening filter.

10. The method of claim 9, wherein each of the one dimensional filters has an odd number of taps with an assigned weight;

the weights of an n tap long blur or n tap short blur filter include n−1 weights that are half or less than half of the weight of the center tap;

the one dimensional short blur filter has six taps or less;

the one dimensional long blur filter has ten taps or more; and the one dimensional sharpening filter has at least two negative valued tap weights.

11. The method of claim 2, wherein the threshold criteria is a measure of the statistical variance of all pixel values in the filter dependent region of pixels.

12. The method of claim 11, wherein the filter dependent region of pixels must have a statistical variance less than a predetermined statistical variance for the threshold criteria to be satisfied.

13. The method of claim 2, wherein the threshold criteria is a measure of the difference between pixel values in the filter dependent region of pixels and a target pixel value.

14. The method of claim 13, wherein each pixel value in the filter dependent region of pixels must be compared with the target pixel value and the difference between each pixel value and the target pixel value must be less than a predetermined threshold.

15. An apparatus for encoding a video signal having at least one frame including a matrix of pixels, comprising:

a memory; and a processor configured to execute instructions stored in the memory to:

select a set of pixels within the frame;

determine an initial performance measurement for the selected set of pixels;

perform a threshold determination on at least one pixel in the set of pixels by determining whether a measurement of a filter dependent region of pixels satisfies a threshold criteria;

provisionally apply at least one filter to the selected set of pixels;

determine a second performance measurement for each of a plurality of strength settings for each filter provisionally applied to the selected set of pixels, such that each provisional application of a filter is associated with a plurality of performance measurements;

compare each second performance measurement with the initial performance measurement; and apply the at least one filter to the selected set of pixels to generate a reconstruction of the frame based on a determination that the at least one filter has a second performance measurement that is better than the initial performance measurement.

16. The apparatus of claim 15, wherein the initial performance measurement and the second performance measurement are rate distortion; and for each filter that received a second rate distortion measurement lower than the initial rate distortion measurement, applying each filter at a strength setting indicated to produce the lowest rate distortion measurement to the selected set of pixels.

17. The apparatus of claim 16, wherein to determine rate distortion for each of a plurality of strength settings, the processor is further configured to:

alter a threshold value for each strength setting; and determine a rate distortion value for each strength setting.

18. An apparatus for encoding a video signal having at least one frame including a matrix of pixels, comprising:

means for selecting a set of pixels within the frame;

means for determining an initial performance measurement for the selected set of pixels;

means for provisionally applying at least one filter to the selected set of pixels;

means for determining a second performance measurement for each of a plurality of strength settings for each filter provisionally applied to the selected set of pixels, such that each provisional application of a filter is associated with a plurality of performance measurements;

means for comparing each second performance measurement with the initial performance measurement; and means for applying the at least one filter to the selected set of pixels to generate a reconstruction of the frame based on a determination that the at least one filter has a second performance measurement that is better than the initial performance measurement.

19. The apparatus of claim 18, wherein the initial performance measurement and the second performance measurement are rate distortion; and for each filter that received a second rate distortion measurement lower than the initial rate distortion measurement, applying each filter at a strength setting indicated to produce the lowest rate distortion measurement to the selected set of pixels.

20. The apparatus of claim 19, wherein means for determining a rate distortion value for each of a plurality of strength settings further comprises:

means for altering a difference threshold value for each strength setting; and means for determining a rate distortion value for each strength setting.

\* \* \* \* \*